United States Patent [19]

Druxeis

[11] 4,130,371
[45] Dec. 19, 1978

[54] CUTTING INSERT AND ROTARY CUTTER TOOL

[75] Inventor: Rudolf Druxeis, Landshut, Germany

[73] Assignee: Sandvik Aktiebolag, Sandviken, Sweden

[21] Appl. No.: 814,843

[22] Filed: Jul. 11, 1977

[30] Foreign Application Priority Data

Jul. 14, 1976 [DE] Fed. Rep. of Germany ....... 2631666

[51] Int. Cl.² .......................... B26D 1/00; B23B 51/00
[52] U.S. Cl. ................................. 407/114; 407/120; 408/196; 408/154; 408/714
[58] Field of Search ............... 408/147, 154, 156, 186, 408/192, 196, 200, 202, 215, 714; 407/113, 114, 116, 120

[56] References Cited

U.S. PATENT DOCUMENTS

| | | | |
|---|---|---|---|
| 2,710,549 | 6/1955 | Cogsdill | 408/202 |
| 3,345,888 | 10/1967 | Gustkey | 408/200 |
| 3,702,611 | 11/1972 | Fishbein | 408/154 |
| 3,751,177 | 8/1973 | Faber | 408/200 |
| 3,973,861 | 8/1976 | Sussmuth | 408/154 |
| 4,047,826 | 9/1977 | Bennett | 407/114 |

Primary Examiner—Harrison L. Hinson
Attorney, Agent, or Firm—Burns, Doane, Swecker & Mathis

[57] ABSTRACT

The rotary cutter tool assembly, including cutting insert, of the present invention is adapted to perform a finishing operation within a tube in such manner that tube wall thickness is ensured. To this end, the novel insert is provided with a guiding surface adjacent to the cutting edge of the insert, which guiding surface is displaced towards the central portion of the insert at a distance corresponding to the desired depth of cut. The insert is secured to the rotatable cutter head in such relation that said guiding surface precedes the cutting edge in the direction of rotation of the cutter head.

10 Claims, 11 Drawing Figures

CUTTING INSERT AND ROTARY CUTTER TOOL

The present invention relates to a cutting insert and to a rotary cutter tool for chip cutting operations.

The cutting insert and cutter tool assembly according to the invention are especially adapted to perform a finishing operation within tubes, i.e. the metal in the interior wall of the tube is to be subjected to slight cutting action. Such operations are needful to hot rolled tubes before they are subjected to subsequent cold rolling operations. To date, rotating cutter tools for this purpose have been equipped with fixed inserts which results in exact cylindrical bore drilling of the tubes while tubes produced by hot rolling have a uniform wall thickness, they certainly do not have perfect cylindrical exterior and interior surfaces, which means that exact cylindrical bore drilling thereinto will produce a tube with uneven wall thickness therealong, which result is not to advantage at subsequent working operations. Another disadvantage therewith is that chip removal will not be of uniform appearance which negatively affects the chip cutting operation.

It is the purpose of the present invention to obviate the aforementioned difficulties by providing a cutting insert and rotating cutter tool with which a uniformly distributed chip removal can be produced such that wall thickness diminishes uniformly along the tube and exact tolerances can be maintained.

To this end the insert is provided with a cutting edge and a guiding surface located adjacent thereto, said guiding surface being displaced towards the central portion of the insert at a distance corresponding to the cutting depth desired. This cutting insert is adapted to be located on a rotatable cutter head such that said guiding surface of the insert is located in front of the cutting edge as seen in feeding direction so as to support against the wall not yet subjected to cutting action. Hence, the cutting insert has a predetermined cutting depth.

According to a preferred embodiment of the invention, the cutting insert is an indexable insert of square or rectangular shape, opposed side surfaces of which define the cutting edges and said guiding surfaces located adjacent thereto. The cutting edges and the adjacent guiding surfaces are suitably both of convex shape.

The invention will now be described in detail, and with reference to the accompanying drawings in which.

Figure 1:
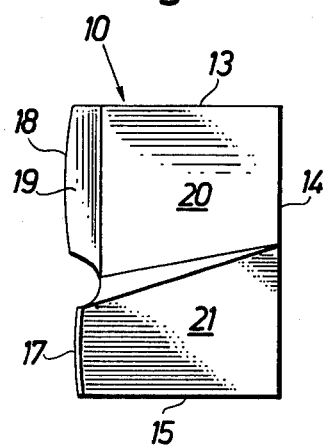
FIGS. 1, 2 and 3 show top, side and end views of a cutting insert according to one embodiment of the invention.
Figure 2:
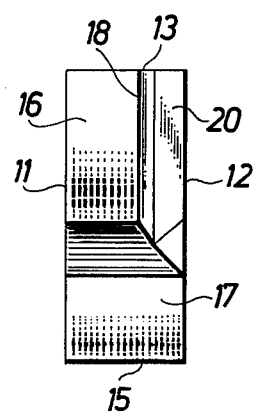
Figure 3:
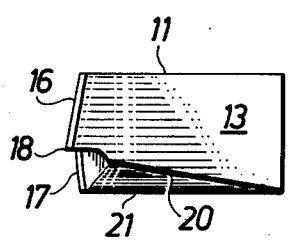

Referring to FIGS. 1-3, a cutting insert is indicated generally by the numeral 10 and mainly configured as a rectangular block, the bottom surface 11, top surface 12 and three side surfaces 13, 14, 15 of which are flat surfaces whereas the fourth side surface is composed of two surface portions 16 and 17 displaced at a fixed distance from each other. One surface portion 16 is cylindrical in shape and intersects with the top surface 12 defining a cutting edge 18 convex in shape. The other surface portion 17 is located adjacent said first surface portion 16.

The said second surface portion 17 is spherical in shape, so as to define a peripheral guide support convex in shape and adapted to support the insert against a workpiece. The said guide support or guiding surface is intended to be located in front of the cutting edge 18 in the feeding direction, for instance in tube boring as will be described more in detail hereinafter. This guiding surface 17 then is to be displaced towards the center of the insert 10 at a distance corresponding to the cutting depth desired. Hence, the insert 10 is provided with a predetermined cutting depth. Furthermore, the insert 10 has a sintered-in-chip breaker 19 along cutting edge 18, and the top surface portion 20 is obliquely disposed by inclining downwards toward said cutting edge 18 whereas top surface portion 21 is parallel with bottom surface 11.

Figure 4:
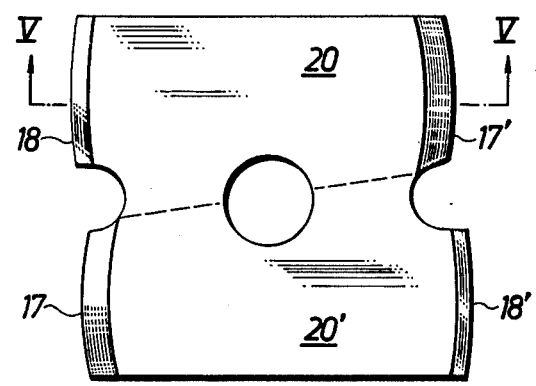
FIGS. 4-5 show a top view and cross-section along the line V—V respectively of an indexable insert.
Figure 5:
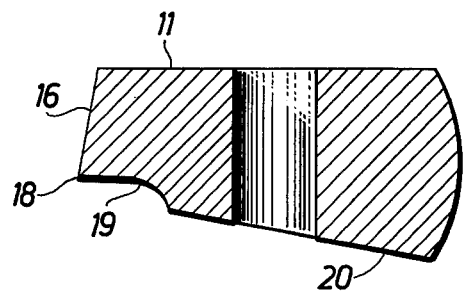

In FIGS. 4-5 there is shown a cutting insert similar to the embodiment already described except that it is indexable and basically in the shape of a square block. Hence, it comprises cutting edges 18 and $18^1$ located in opposite side surfaces and guide supports 17 and $17^1$ located adjacent thereto. Top surface portions 20 and $20^1$ are obliquely disposed in opposed directions.

Figure 6:
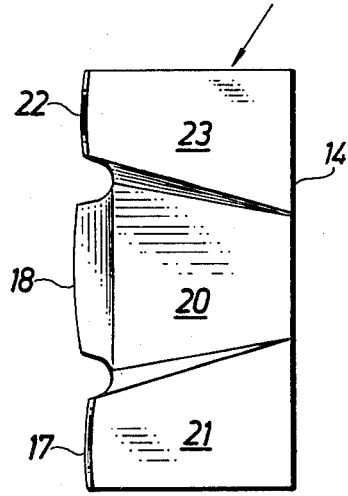
FIGS. 6, 7 and 8 show top, side and end views of a cutting insert according to another embodiment of the invention.
Figure 7:
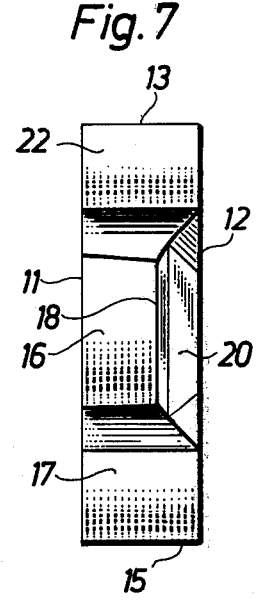
Figure 8:
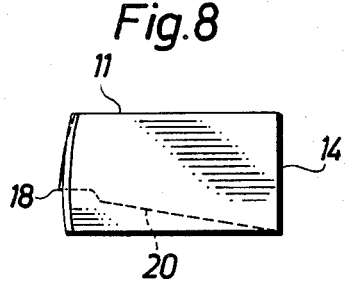

FIGS. 6-8 show a cutting insert of another design, mainly configured as a rectangular block. One side surface is, similar to the embodiments already shown, — composed if a cylindrical surface portion 16 intersecting with the top surface to define cutting edge 18 of convex shape whereas another surface portion 17 is displaced towards the center of the insert at a fixed distance corresponding to cutting depth desired, said last surface portion 17 being spherical in shape to define a guide support convex in shape. Additionally, this insert is provided with yet another guiding surface portion 22 located on the opposite side of said cutting edge and displaced towards the center of the insert at a fixed distance smaller than said cutting depth, said surface portion 22 also being spherical in shape to define an additional guide support convex in shape. This last guide support 22 is adapted to be located behind the cutting edge in the feeding direction, for instance in tube boring. This last-mentioned support 22 then gives support against the inner tube wall, when the cutter tool moves out through the opening of said tube. The top surface portion 23 adjoining said guide support 22 is, like surface portion 21 adjoining support 17, parallel with bottom surface 11.

Figure 9:
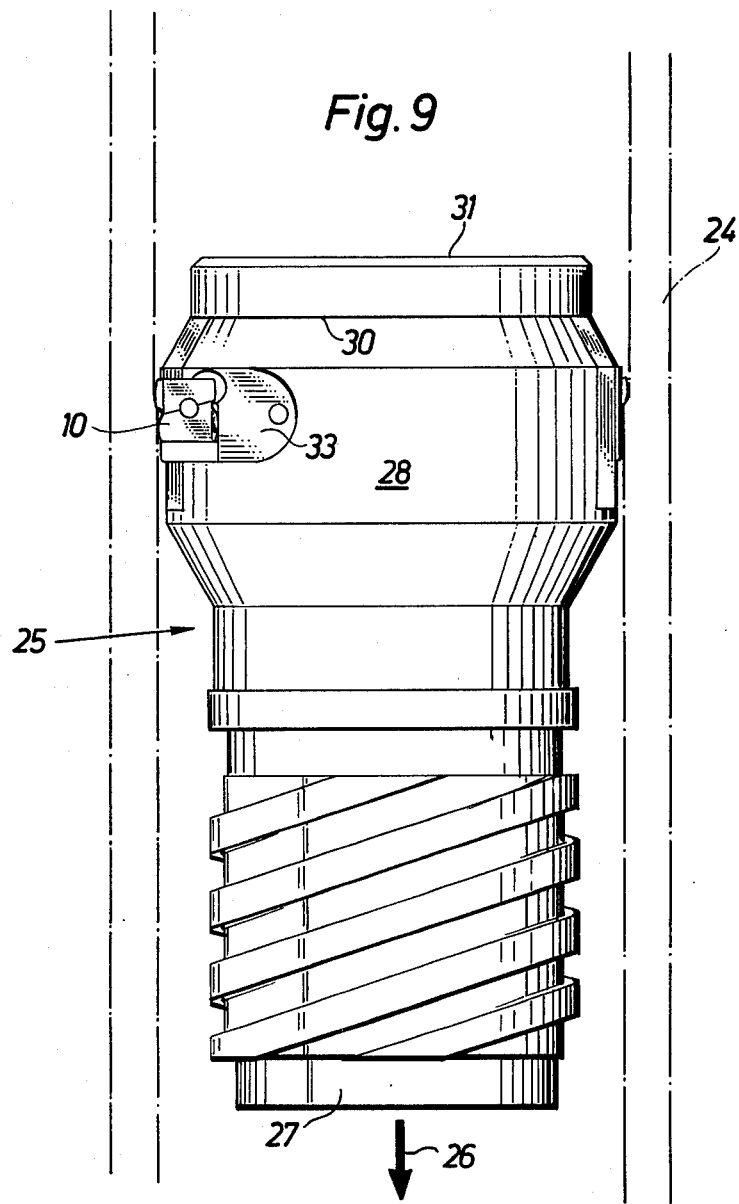
FIG. 9 shows a view of a preferred embodiment of a rotary cutter tool of the invention.
Figure 10:
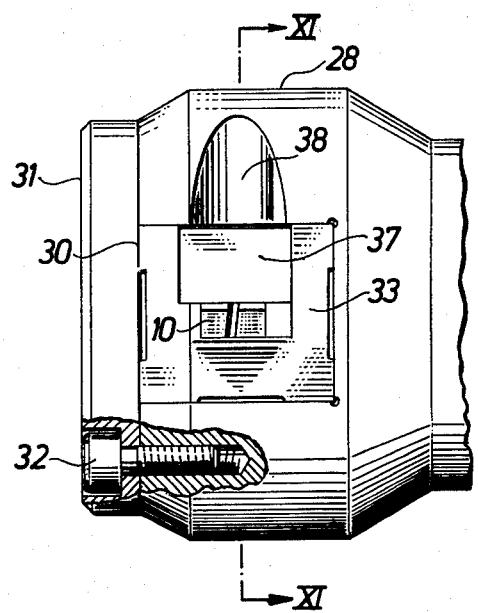
FIG. 10 shows a side view of the cutter tool after being turned 90° from the position shown in FIG. 9.
Figure 11:
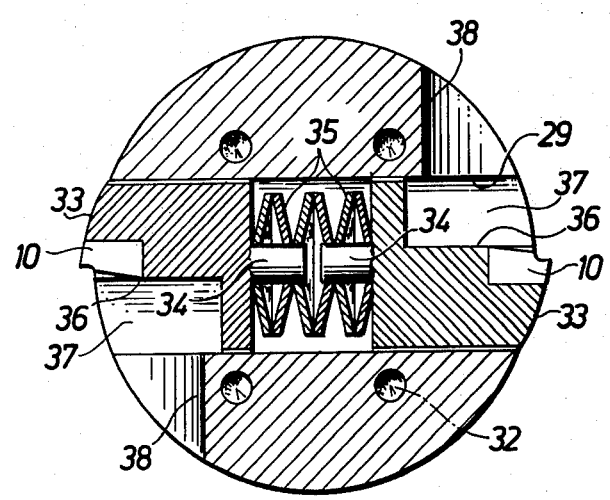
FIG. 11 shows a cross-section along the line XI—XI in FIG. 10.

In FIG. 9 a metallic tube 24 is subjected to a boring operation by a rotary cutter tool 25 equipped with cutting inserts 10 of a design previously described and shown in FIGS. 4-5, the feeding direction of which is indicated at 26. The cutter tool 25 is drawn through the tube 10 by means of a boring bar connected with the cutter tool. The rotary cutter tool is basically composed of two parts, one of which is a shaft portion 27 adapted to be connected with said boring bar (not shown), the other being cutter head 28. The cutter head is cylindrical in cross-section and provided with a diametrically extending guide recess 29 which adjoins the front surface 30 of the cutter head. A cover plate 31 is secured to said front surface 30 by threaded bolts 32.

Two support bodies 33 are located in said recess 29, both of which being radially displaceable. Each said support body 33 is provided with a radial extension 34 upon which spring washers or Belleville springs 35 are received, said springs 35 of each support body 33 being located opposite each other so as to support each other and to urge the support body 33 radially outwards.

If the cutter head 28 is provided with more than two support bodies 33, which is suitable at larger diameters, each support body is secured into a separate radially extending recess, said recesses 29 then being evenly distributed around the cutter head 28. When providing three such recesses 29 the angular difference therebetween is 120° and when arranging five recesses the angular difference is 72°. It is to be understood that the Belleville springs 35 for each support body 33 in such cases cannot act as support means for any additional support body. When arranging cutter heads provided with more than two support bodies, adapted for large diameters, the support bodies and the appertaining spring means can, without difficulty, be received in recesses of smaller depths not radially opposed each other, the spring means then received abutment against the bottom of each said recess.

Each support body 33 is provided with a cutting insert 10 of cemented carbide which is indexable and has a design as shown in FIGS. 4–5. This means that the insert is provided with a first cutting edge 18 and a second cutting edge $18^1$ the second one being adapted to be used by turning the insert around its center line when the first one has become worn out. A guide support 17 and $17^1$ is located adjacent each said cutting edge 18 and $18^1$ respectively. This guide support is adapted to be located in front of the cutting edge in order to support the cutter head against the interior wall portion of said tube 10 not yet subjected to cutting action. Due to such arrangement the guide support 17 or $17^1$ is caused always to follow the interior tube wall axially which results in that chips will be obtained always having the same thickness. It is to be understood that the side surface 16 associated with the cutting edge 18 is formed in such manner that there is presented a suitable clearence angle at said cutting edge.

Each support body 33 is L-shaped in cross-section, thus providing a depressed surface 36 in which the cutting insert 10 is received. The insert 10 has a central aperture to receive a suitable clamping element, but it is to be understood that any other type of clamping arrangement may also apply. In front of the insert 10 there is provided an open space 37 which is widened by providing a recess 38 in the head 28 itself. Due to this arrangement the clamping means of the cutting insert will be easily accessible.

I claim:

1. Cutting insert for chip cutting operations comprising opposed top and bottom surfaces and side surfaces located therebetween, characterized in that at least one of said side surfaces being composed of two surface portions displaced at a fixed distance, the first surface portion (16) intersecting with said top surface to define a cutting edge (18) whereas the second surface portion (17) defines a guide support displaced towards the center of the insert at a fixed distance from said cutting edge corresponding to the cutting depth desired.

2. Cutting insert as defined in claim 1, characterized in that said side surface, composed of displaced surface portions, comprises guide surfaces located on opposite sides of said cutting edge, one guide support surface (17) being displaced towards the center of the insert at a fixed distance from said cutting edge corresponding to the cutting depth desired, the other guide support surface (22) being displaced towards the center of the insert at a distance from said cutting edge smaller than said cutting depth.

3. Cutting insert as defined in claim 1, characterized in that the cutting edge (18) and the guide surface (17) are convex in shape.

4. Cutting insert as defined in claim 3, characterized in that the surface portion (16) defining said cutting edge (18) is cylindrical in shape whereas said guide surface (17) is spherical in shape.

5. Cutting insert as defined in claim 1, characterized in that the insert basically is in the shape of a square or rectangular block.

6. Cutting insert as defined in claim 5, characterized in that the insert is indexable, having cutting edges and guide surfaces located on opposite parallel side surfaces of said block.

7. Cutting insert as defined in claim 5, characterized in that the top surface portion (21) adjoining said guide surface portion (17) is located in a plane parallel with the bottom surface (11) whereas the top surface portion (20) adjoining said cutting edge (18) is a plane surface obliquely disposed by inclining downwards towards said cutting edge.

8. A rotary cutter tool comprising a cutter head equipped with a plurality of cutting inserts evenly distributed around the periphery of said head, each said cutting insert comprising opposed top and bottom surfaces and side surfaces therebetween, at least one of said side surfaces being composed of two side portions intersecting with said top surface to define a cutting edge, the second surface portion defining a guide support displaced towards the center of the insert at a fixed distance from said cutting edge corresponding to the cutting depth required, said tool being further characterized in that each cutting insert (10) is located on the cutter head (28) in such manner that the guide support $(17,17^1)$ is located in front of the cutting edge $(18,18^1)$ of said insert in the feeding direction, at least one of said cutting inserts being located on a support body (33) which is radially displaceable in a recess (29) of said cutter head.

9. A rotary cutter tool as defined in claim 8, characterized in that said support body is radially displaceable by spring means (35).

10. A rotary cutter tool as defined in claim 9, characterized in that the support bodies (33) are provided with radial extensions (34) upon which spring means in the shape of spring washers (35) are received.

* * * * *